United States Patent
Chliwnyj et al.

(10) Patent No.: US 6,574,679 B1
(45) Date of Patent: Jun. 3, 2003

(54) METHOD AND APPARATUS FOR IDENTIFYING HARDWARE

(75) Inventors: Alex Chliwnyj, Tucson, AZ (US); Mark Edward Hill, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/360,838

(22) Filed: Jul. 26, 1999

(51) Int. Cl.[7] .................. G06F 13/10; G06F 15/177
(52) U.S. Cl. .................. 710/10; 710/8; 710/104; 713/1
(58) Field of Search .................. 713/1, 2, 100, 713/324; 710/8, 10, 104

(56) References Cited

U.S. PATENT DOCUMENTS

| | | | |
|---|---|---|---|
| 3,761,889 A | 9/1973 | Hallee et al. | 340/172.5 |
| 4,842,177 A | 6/1989 | Callender et al. | 226/97 |
| 5,121,500 A | 6/1992 | Arlington et al. | 395/750 |
| 5,122,970 A * | 6/1992 | Gilbert et al. | 702/33 |
| 5,216,556 A | 6/1993 | Steinberg et al. | 360/74.3 |
| 5,355,129 A * | 10/1994 | Baumann | 324/601 |
| 5,655,149 A | 8/1997 | Muegge et al. | 395/830 |
| 5,694,213 A | 12/1997 | Gable | 345/132 |
| 5,794,625 A * | 8/1998 | McCarley et al. | 600/549 |
| 5,802,362 A | 9/1998 | Lipp et al. | 395/651 |
| 5,948,077 A | 9/1999 | Choi et al. | 710/9 |
| 6,191,687 B1 * | 2/2001 | Dlugos et al. | 307/419 |

FOREIGN PATENT DOCUMENTS

| | | | |
|---|---|---|---|
| JP | 63-149715 | * | 6/1988 |
| JP | 10143463 | | 5/1998 |

* cited by examiner

*Primary Examiner*—Jeffrey Gaffin
*Assistant Examiner*—Ilwoo Park
(74) *Attorney, Agent, or Firm*—Douglas R. Millett; Bracewell & Patterson, L.L.P.

(57) ABSTRACT

A microprocessor (digital device) with microcode is incorporated in a mechanical device, having analog electrical signaling wires, to send a digital signal containing identifying data of the device to a central computer. The digital signal includes operating ranges and any other information that will allow the central computer system to recognize the mechanical device and automatically incorporate the device's operating characteristics into the total system without disruption. The digital signal is transmitted to the central computer system immediately after a power-on signal is detected by the microprocessor on board the mechanical device.

9 Claims, 4 Drawing Sheets

METHOD AND APPARATUS FOR IDENTIFYING HARDWARE

BACKGROUND OF THE INVENTION

1. Technical Field

The present invention relates in general to data processing systems and in particular to identifying analog devices. More particularly, the present invention relates to providing identity and/or calibration information of the analog device to a control system.

2. Description of the Related Art

It is a common practice in industry for Original Equipment Manufacturers (OEMs) to rely on third party vendors to supply replacement parts for computer associated systems. OEMs provide standards for third party vendors to build the replacement parts and generally, OEMs provide the parts to the customer. However, customers will purchase and install "equivalent" parts because of price. "Equivalent" parts may be approved by the OEM for replacement, but not carry the same quality control requirements of the OEM. Replacement parts may have variances in the part, but depart from the OEMs specification and require installation service to coordinate the part to the control system. Additionally, an OEM may update or improve a replacement part that performs the same task as the original part but it may have altered tolerances or specifications that require system adjustment upon installation.

In data processing systems, storage subsystems are constantly undergoing improvements. In tape drive storage subsystems, one of the target areas is in improving the tape. Thinner tape has been developed in order to increase data storage and keep tape cartridges the same size for existing tape drive systems. Thinner tape allows more tape to be wound on the same cartridge and thus, increases memory storage for a standard tape drive cartridge. However, thinner tape increases the likelihood that tape breaks will frequently occur because drive motor assemblies for the cartridges were built and tensioned to operate with thicker tape. Economically, customers using tape drive storage would prefer increased storage via improved tape rather than new storage systems because of the replacement cost involved. So, manufacturers of tape drives provide Engineering Changes (EC) and retrofit solutions that will account for the thinner tape.

For instance, the 3590 Magstar™ tape drive, a product of International Business Machines of Armonk, N.Y., required a hardware change to a tension transducer assembly in order to handle new, thinner tape than the standard tape. It was necessary to make changes in the field without requiring the customer to make hardware modifications. Therefore, it was desirable to have microcode available on the new tension transducer assembly that included the mechanical properties of the new transducer. Because this was a field change, hardware had to go into existing drives and no changes could be made to the rest of the system.

For example the function of any of the pins on the new transducer card could not be re-assigned nor could any wires be added to the connector cable. Further, the card had to function normally with old microcode so that the assembly could be put into old drives without affecting their operation. The new transducer cards also have to be used as spare parts for old drives and have to function like the old ones so that the code would not have to be changed to support the new hardware.

The tape drive tension transducer card has a single output. This output is the analog tension signal to the drive motor servo controls. Voltage level output is proportional to the tension detected in the tape. There are no other signal sources or outputs available. Using a DC offset voltage to distinguish the old and new cards does not work, because the signal may not be large enough to allow reliable determination of old and new sensors. Also, if the offset is too large, the signal adversely affects operation of a servo system associated with the tape drive. Utilizing voltage level to distinguish between old and-new transducers is unreliable because the voltage difference between the two signals is too small.

Principally, the tape drive tensioning problem revolved around availability of a single source that is currently utilized to supply an analog signal. There are no other connections that may be used for identification of a replacement hardware device in this area. So, in order to improve the storage capacity of an existing tape drive storage subsystem, a customer its required to install new hardware and adjust the control system to fit the new hardware.

In general, data processing (computer) systems that control and monitor analog devices are constantly being improved and upgraded by OEMs. OEMs that manufacture process control systems offer improved parts and subsystems to customers with older, existing installations. The new parts usually require additional hardware, new procedures, customer installation, etc. Third party vendors are also improving individual subsystems that would improve operation of these computer control systems such as increasing the life of the system, enhance control, improve efficiency, etc.; all economic benefits to the system user. A problem similar to the OEM problem is caused by new and improved parts from third party vendors in that system parameters may have to be changed to incorporate the new parts.

Therefore, it would be desirable to provide a method and apparatus that will provide self-identification for a newly installed analog hardware assembly to a data processing system to which the assembly is being installed. It would further be desirable to provide a method and apparatus that will identify, provide operating characteristics and provide configuration parameters of an analog device to a digital control system.

SUMMARY OF THE INVENTION

It is therefore one object of the present invention to provide a method and apparatus to provide identification of an analog device to a control system.

It is another object of the present invention to provide a method and system for calibrating analog systems without requiring additional wiring for configuration purposes.

It is yet another object of the present invention to provide a method and apparatus for verifying the presence of a device without causing interference in the analog circuitry.

The foregoing objects are achieved as is now described. A microprocessor (or generically, digital state machine and timer) with microcode is incorporated in a mechanical device, having analog electrical signaling wires, to send a digital signal containing identifying data of the device to a central computer. The digital signal includes operating ranges and any other information that will allow the central computer system to recognize the mechanical device and automatically incorporate the device's operating characteristics into the total system without disruption. The digital signal is transmitted to the central computer system immediately after a power-on signal is detected by the microprocessor on board the mechanical device.

The above, as well as additional objects, features, and advantages of the present invention, will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
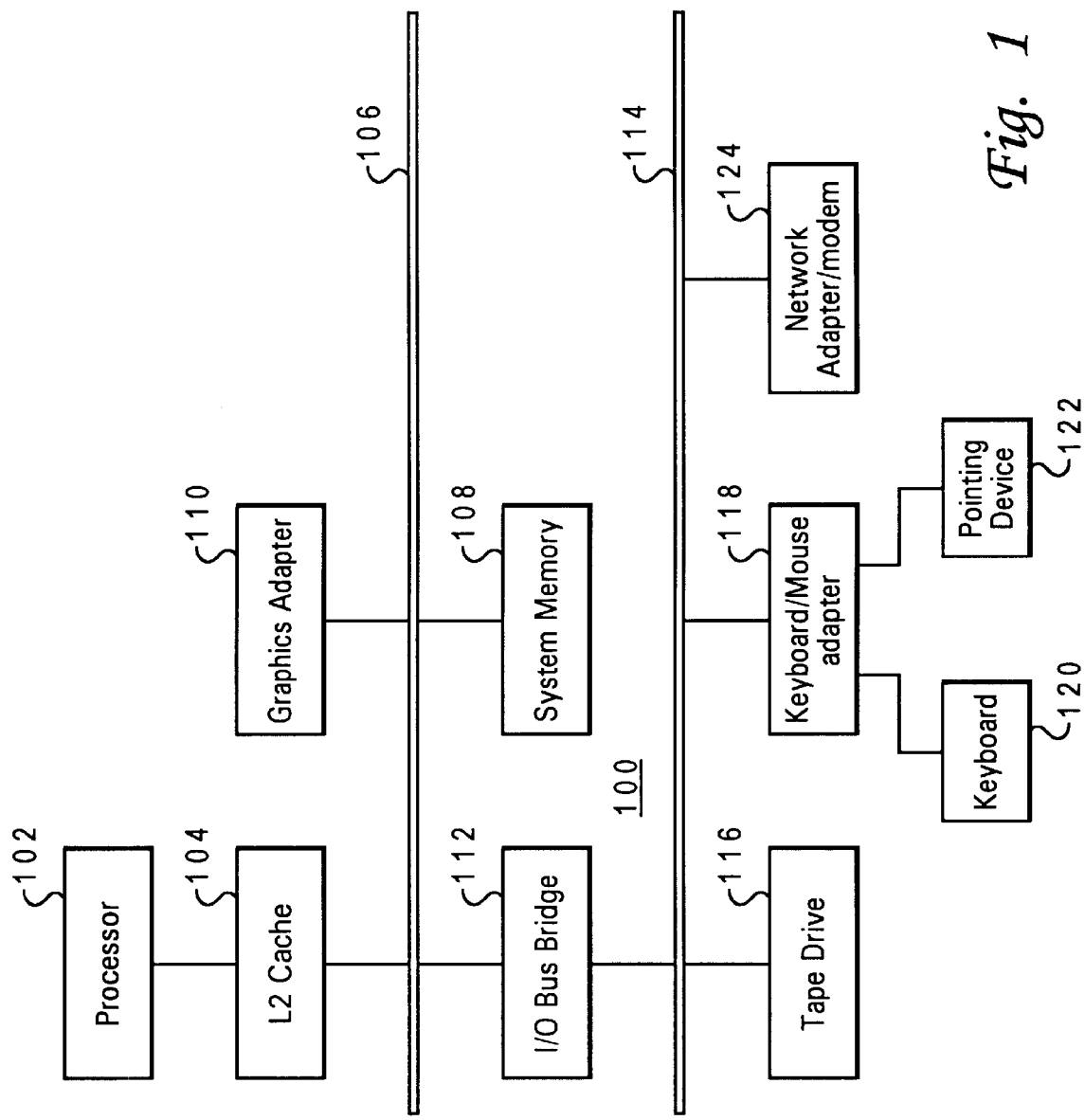
FIG. 1 depicts a high-level block diagram of a data processing system in which a preferred embodiment of the present invention may be implemented.

With reference now to the figures, and in particular with reference to FIG. 1, a high-level flow diagram of a data processing system in which a preferred embodiment of the present invention may be implemented, is depicted. Data processing system 100 in the exemplary embodiment includes a processor 102, which may be a PowerPC™ processor available from International Business Machines Corporation of Armonk, N.Y. Processor 102 is connected to a level two (L2) cache 104, which is utilized to stage data to and from processor 102 at reduced access latency. L2 cache 104 is connected in turn to an interconnect or system bus 106, which is also connected, in the embodiment depicted, to system memory 108 and memory-mapped graphics adapter 110. Graphics adapter 110 provides a connection for a display device (not shown) on which the user interface of software executed within data processing system 100 is displayed.

Also connected to system bus 106 in the exemplary embodiment is input/output (I/O) bus bridge 112, which provides an interface between system bus 106 and I/O bus 114. A nonvolatile memory such as magnetic tape drive 116 may be connected to I/O bus 114, as may keyboard/mouse adapter 118, which provides connection to I/O bus 114 for keyboard 120 and pointing device 122. Pointing-device 122 may be a mouse, trackball, or the like. Also connected to I/O bus 114 may be network adapter 124 for connecting data processing system 100 to a local area network (LAN), the Internet, or both. Those skilled in the art will appreciate that other devices may be incorporated into data processing, system 100, such as an optical-disk drive or a modem.

Figure 2A:
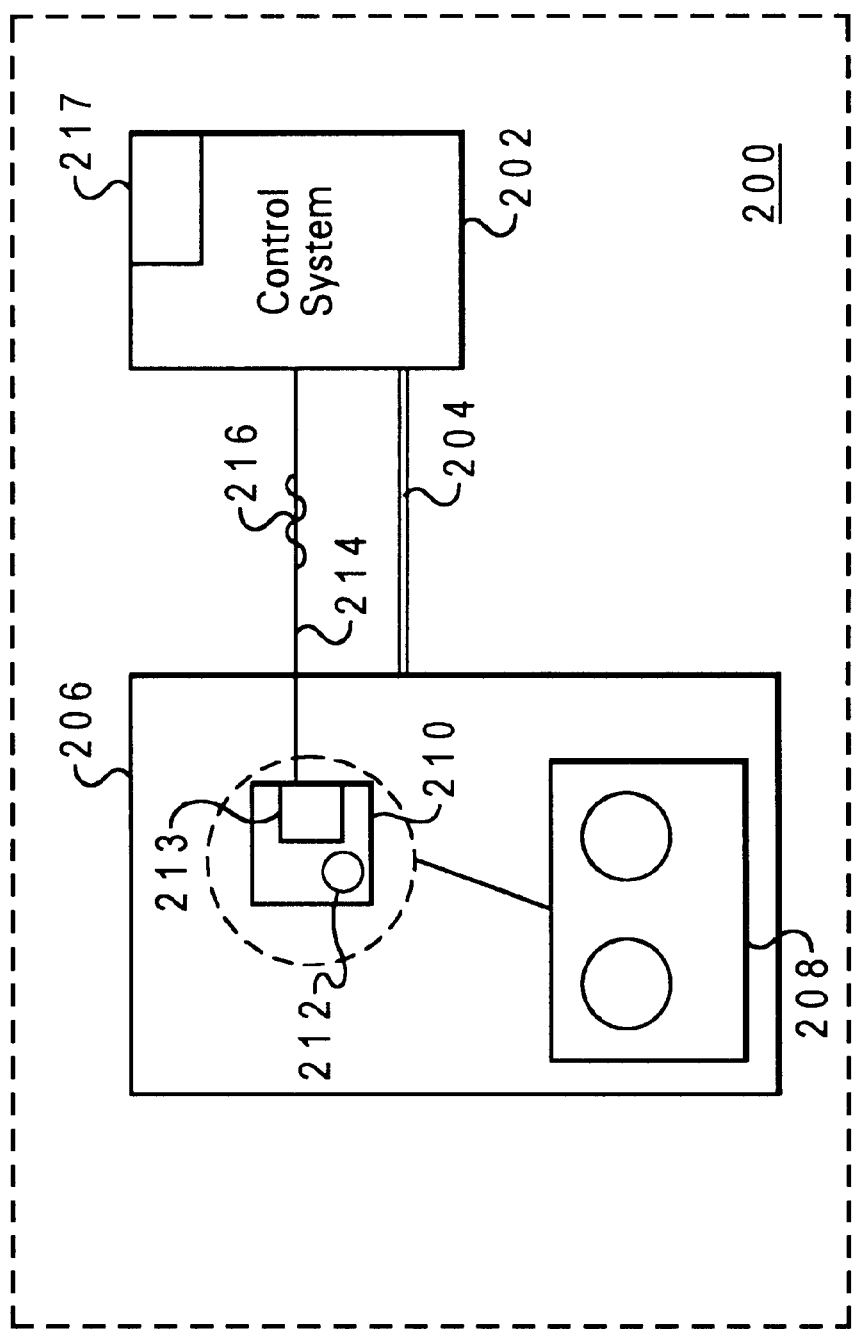
FIGS. 2A–2B are high-level block diagrams of alternative systems in which a preferred embodiment of the present invention may be implemented.

Referring now to FIG. 2A, a high-level block diagram of a magnetic tape storage subsystem connected to a data processing system in accordance with a preferred embodiment of the present invention, is illustrated. In Magnetic tape storage subsystem 200, control system 202 is connected to magnetic tape storage subsystem via I/O bus 204 and by other connections including a signal line 214 connected to tape tension transducer card 210 in tape drive 206. A sensor (not shown) on transducer card 210 comprises a microcontroller 213 which controls a Direct Current (DC) output voltage. Tension transducer 212, during tape drive 206 operation, generates analog voltage signal 216 that is proportional to the tension measured in the magnetic tape (not shown) in magnetic tape cartridge 208. This signal is sent to the data processing system which, in turn, signals tape drive 206 servo motors to adjust tension in response to the voltage signal generated by transducer 212.

At power-on, microcode-in control system 202 has to detect that a true power-on occurred. A true power-on is defined as a voltage cycle in the drive, where voltage is first applied to the drive (i.e., turning on the power switch to a drive). Other types of drive resets include a code reset, where microcode is restarted, or a logic reset, where a "Power-on Reset' (POR) signal is toggled, resetting electronics in tape drive 206, but not actually changing the voltage applied to electronics in tape drive 206. This is important because microcontroller 213 only raises the DC output when voltage is first applied at power-on. There is no reset line to the tension transducer card.

A known-method of discriminating between a reset and a true power-on is used in which a known pattern is written to volatile memory, in this case the detected configuration information of tension transducer card 210. If the pattern is in memory when the code starts, then the drive did not go through a true power-on. If the pattern is not in memory, then the drive is going through a true power-on, and the sensor needs to be checked. Detected configuration information is saved in a non-volatile storage area, termed Vital Product Data (VPD) 217 on board control system 202. In the power-on reset case, where the drive did not go through a true power-on, the information stored in the non-volatile VPD 217 is used to determine which sensor assembly is present.

When voltage is first applied to microcontroller 213 (e.g., when the drive is powered up), microcontroller 213 raises the DC output a significant amount for a small period of time by adding in an offset using a resistor and a transistor switch (neither shown). DC output then drops to the nominal setting of the original tension transducer card. The new tension transducer card 210 may then be used in the same way as the old tension transducer card.

It is during normal operation of the drive that the tension signal needs to behave exactly the same as before. When the drive powers up, the system diagnostics are started first. During the diagnostic time interval the analog signal line is available, as the initialization of the drive has not yet occurred. In this implementation, on start up DC output is raised an extra 3 Volts for 30 seconds as this is the time that is typically taken for initial microprocessor and logic checks in the Magstar™ tape drive Different devices utilizing the present invention may require different voltages and/or more time for initial microprocessor and logic checks. After the microcode in tape drive 206 has determined that the processor is working properly, the new sensor is detected. Logic contained in microcontroller 213 additionally shuts off microcontroller's 213 internal clock (not shown) and goes into sleep mode at the end of the 30 second time period. This effectively removes it from the circuit and avoids adding any additional noise on the tension signal. In sleep mode it draws only microamps of power.

After a true power-on, hardware is initialized to detect the DC output of the sensor. If the higher DC output is detected, microcode on board the computer knows that the new type of tape cartridge can be supported. If the higher DC output is not detected, microcode will reject the new tape cartridge and not allow it to load. Tension transducer card 210 detect a power signal and distinguishes between a true power-on signal and a power reset signal. During the diagnostic time window, the processor may transmit all the necessary information to identify the transducer and provide performance values for the new transducer device.

Figure 2B:
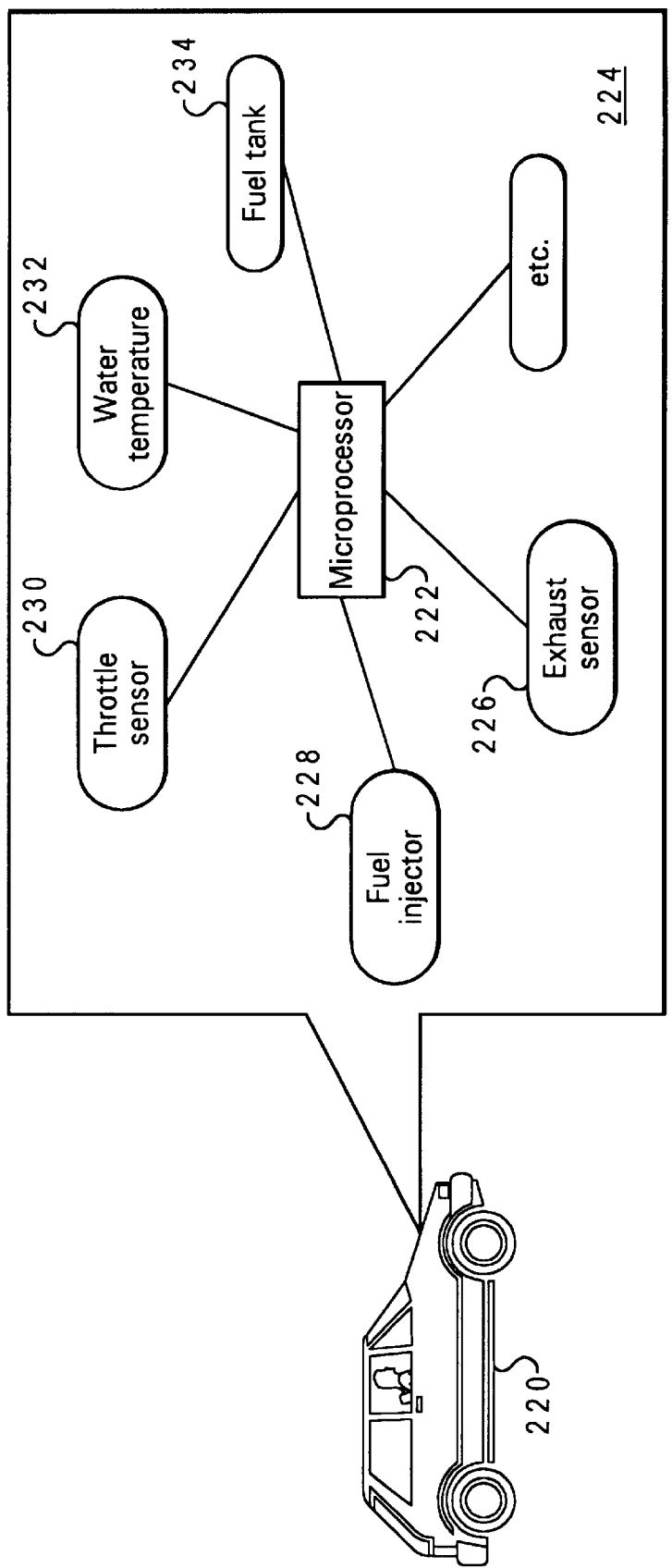

Referring now to FIG. 2B, a high-level block diagram of a computer system in an automobile in accordance with a preferred embodiment of the present invention, is depicted. Automobile 220 has a computer system 224 with multiple devices which monitor the various systems on board automobile 220. Sensors 226–234 are just a few of the sensors required to operate an automobile that uses a computer system. Each sensor is typically manufactured to meet original equipment standards and is configured with the computer system when manufactured and installed on board an automobile. A replacement sensor should be manufactured the same as the original, but aftermarket devices may have different specifications and outputs. Since the devices are electrically connected to the computer and sensing data is transmitted by these devices, it would be natural to provide microcode stored in a microprocessor on the sensor device. The microcode would contain all operating characteristics, performance, voltage parameters, etc. of the subject device. The computer would have access to the information at startup, for example when the key is inserted into the ignition and turned from the on position to the start position. The analog device's onboard microprocessor sends a burst of identifying data along with operating characteristics via the sensor wire and then goes into sleep mode until another power up signal or device query is detected.

Figure 3:
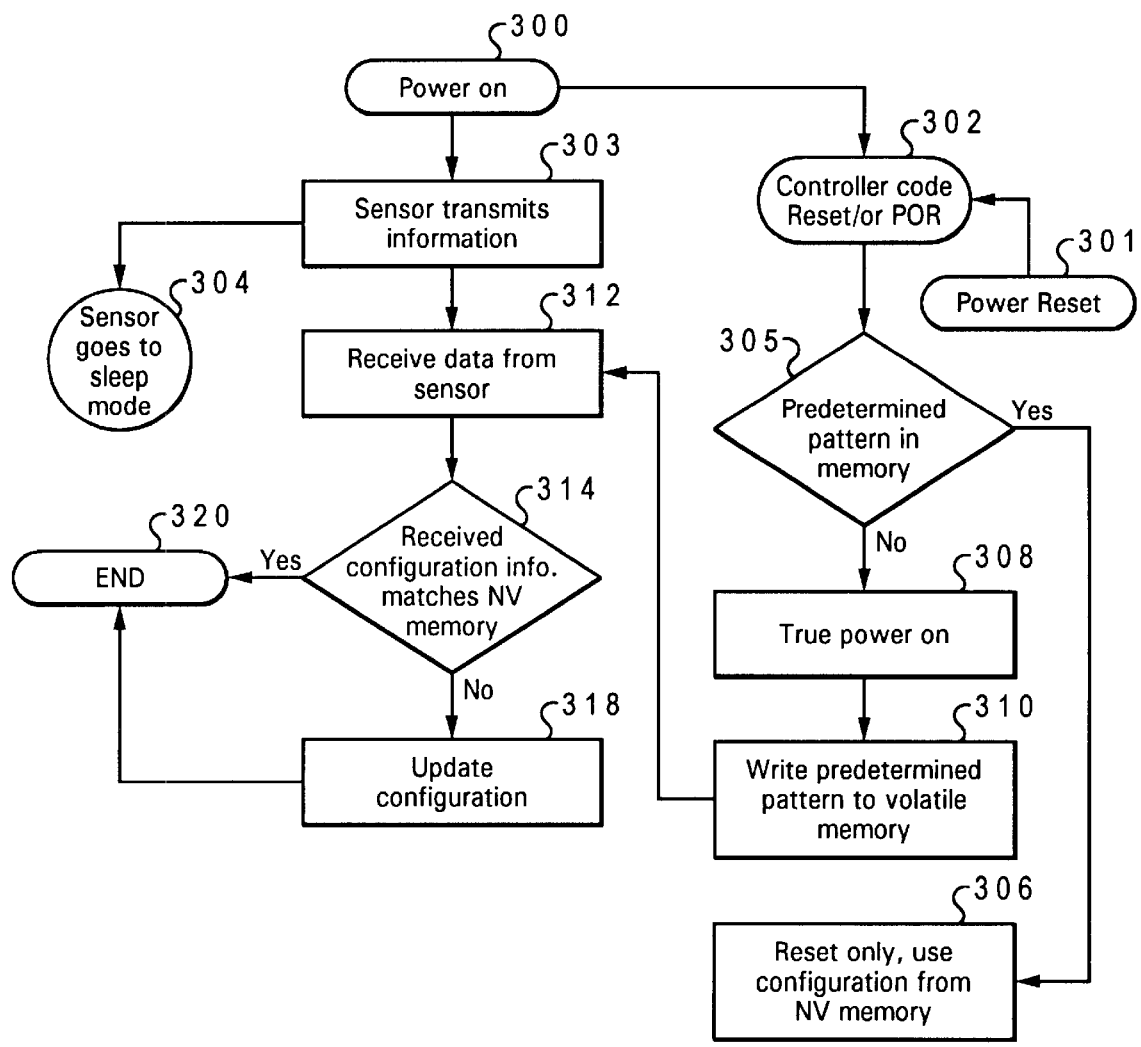
FIG. 3 depicts a high-level flow diagram of a method identifying an analog device in accordance with a preferred embodiment of the present invention.

Referring now to FIG. 3, a high-level flow diagram of a method identifying an analog device in accordance with a preferred embodiment of the present invention, is depicted. In this flow diagram, the process is described in the case of a tension transducer for a tape drive in a data processing system. The process begins with step 300, which depicts power-on in the control system, including power to a tension transducer card for a tape drive on the system. Alternatively, the power-on may not be a true power-on but a power-on reset. If the event is a power-on reset, the process begins at step 301, which depicts a power-on reset. The transducer card includes an analog signaling device and is provided with a microprocessor containing operating characteristics of the analog device and microcode for transmitting identifying and operating characteristics over the analog signaling line to the control system in a digital form.

The process proceeds from step 300 or 301 to step 302, which illustrates a tape drive controller powering up and commencing power-on 300 or a power-on reset (POR). 301 program sequence. Concurrently, the process also passes from step 300 to step 303, which depicts a microcontroller on board the transducer card sending an increased DC voltage to signal a new, or different, analog device. The process then passes concurrently to step 304, which illustrates the sensor going into sleep mode, concurrently with step 312, which depicts transmitting identity configuration information.

Returning to step 302, the process passes to step 305, which depicts a determination of whether the power-on signal is a true power-on signal. The control system checks for configuration information (also referred to as a "data pattern") stored in the volatile memory, as discussed previously. If the pattern is present in memory when the code starts, the device (in this example the tape drive) did not go through a true power-on. The process then proceeds to step 306, which illustrates the determination that the signal is a power-on reset signal. Configuration data is not updated and the data pattern commonly stored in non-volatile (NV) and volatile memory is utilized.

When the controller is powered on or receives a reset, it checks for a data pattern present in volatile memory. If the data pattern is not in volatile memory, the process continues to step 308, which depicts the control system confirming that the signal is a true power-on signal and the control system is expecting a configuration signal from the sensor. The process then passes to step 310, which illustrates the control system writing pre-determined configuration information non-volatile memory to volatile memory. The process proceeds to step 312, which depicts receiving configuration information from the sensor. Next, the process proceeds to step 314, which depicts a determination of whether configuration information received from the sensor is the same as the pre-determined configuration information pattern in NV memory. If the configuration information is the same, the process proceeds to step 320, which illustrates the end of the procedure. If the configuration information is not the same, the process proceeds instead to step 318, which depicts the control system updating (writing) the configuration in NV memory. The process then passes to step 320, which illustrates the end of device identification procedure.

In general, the implementation carries one bit of signaling data (a voltage level must be above or below a threshold—in the above example above the threshold). An analog sensor employing the present invention can identify itself or send calibration information to the system at power-on time using an analog line to transmit digital information and behave as an analog circuit during run time. This identity or calibration information is stored in the one time programmable processor. Sensors from different manufacturers may be used with different gains or offsets and identify themselves to the system. The present invention would allow calibration of analog sensors without extra wires. The present invention allows verification of the presence of the sensor and the microprocessor removes itself from the circuit after performing the operation and does not cause interference in the analog circuitry.

It is important to note that while the present invention has been described in the context of a fully functional device, those skilled in the art will appreciate that the mechanism of the present invention and/or aspects thereof are capable of being distributed in the form of a computer usable medium of instructions in a variety of forms, and that the present invention applies equally regardless of the particular type of signal bearing media used to actually carry out the distribution. Examples of computer usable media include: nonvolatile, hard-coded type media such as read only memories (ROMs) or erasable, electrically programmable read only memories (EEPROMs), recordable type media such as floppy disks, hard disk drives and CD-ROMs, and transmission type media such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A method for configuring a tape drive in a data processing system, said method comprising:

initially powering up a tape drive;

disabling a tape tension sensor in said tape drive while said tape drive performs a self-diagnostic test, said tape tension sensor having a sensor output line for transmitting an analog sensor signal proportional to a tape tension of a tape in said tape drive during normal operation;

applying an increased direct current voltage to said sensor output line while said tape tension sensor is disabled, said increased direct current voltage being an indicator that any signal transmitted on said sensor output line while said direct current voltage is increased on said sensor output line is a configuration information signal describing said tape drive;

transmitting a configuration information signal from said tape drive to a control system via said sensor output line while said sensor output line has said applied increased direct current voltage, said configuration information signal including a mechanical tension property of said tape tension sensor;

comparing said configuration information signal to a stored predetermined pattern in said control system to determine if said tape drive is a new device; and updating a configuration for said tape drive if said tape drive is a new device.

2. The method of claim 1, said method further comprising:
determining a compatibility of a new tape with said tape drive; and
prohibiting said new tape from loading into said tape drive if said tape drive is not compatible with said new tape.

3. The method of claim 1, said method further comprising:
enabling said tape tension sensor after said tape drive performs said self-diagnostic test.

4. A tape drive for a data processing system, said tape drive comprising:
means for initially powering up a tape drive;
means for disabling a tape tension sensor in said tape drive while said tape drive performs a self-diagnostic test, said tape tension sensor having a sensor output line for transmitting an analog sensor signal proportional to a tape tension of a tape in said tape drive during normal operation;
means for applying an increased direct current voltage to said sensor output line while said tape tension sensor is disabled, said increased direct current voltage being an indicator that any signal transmitted on said sensor output line while said direct current voltage is increased on said sensor output line is a configuration information signal describing said tape drive;
means for transmitting a configuration information signal from said tape drive to a control system via said sensor output line while said sensor output line has said applied increased direct current voltage, said configuration information signal including a mechanical tension property of said tape tension sensor;
means for comparing said configuration information signal to a stored predetermined pattern in said control system to determine if said tape drive is a new device; and
means for updating a configuration for said tape drive if said tape drive is a new device.

5. The tape drive of claim 4, said tape drive method further comprising:
means for determining a compatibility of a new tape with said tape drive; and
means for prohibiting said new tape from loading into said tape drive if said tape drive is not compatible with said new tape.

6. The tape drive of claim 4, said tape drive further comprising:
means for enabling said tape tension sensor after said tape drive performs said self-diagnostic test.

7. A computer usable medium for analyzing causes for configuring a tape drive for a data processing system, said computer usable medium comprising:
computer program code for initially powering up a tape drive;
computer program code for disabling a tape tension sensor in said tape drive while said tape drive performs a self-diagnostic test, said tape tension sensor having a sensor output line for transmitting an analog sensor signal proportional to a tape tension of a tape in said tape drive during normal operation;
computer program code for applying an increased direct current voltage to said sensor output line while said tape tension sensor is disabled, said increased direct current voltage being an indicator that any signal transmitted on said sensor output line while said direct current voltage is increased on said sensor output line is a configuration information signal describing said tape drive;
computer program code for transmitting a configuration information signal from said tape drive to a control system via said sensor output line while said sensor output line has said applied increased direct current voltage, said configuration information signal including a mechanical tension property of said tape tension sensor;
computer program code for comparing said configuration information signal to a stored predetermined pattern in said control system to determine if said tape drive is a new device; and
computer program code for updating a configuration for said tape drive if said tape drive is a new device.

8. The computer usable medium of claim 7, said computer usable medium further comprising:
computer program code for determining a compatibility of a new tape with said tape drive; and
computer program code for prohibiting said new tape from loading into said tape drive if said tape drive is not compatible with said new tape.

9. The computer usable medium of claim 7, said computer usable medium further comprising:
computer program code for enabling said tape tension sensor after said tape drive performs said self-diagnostic test.

* * * * *